UNITED STATES PATENT OFFICE.

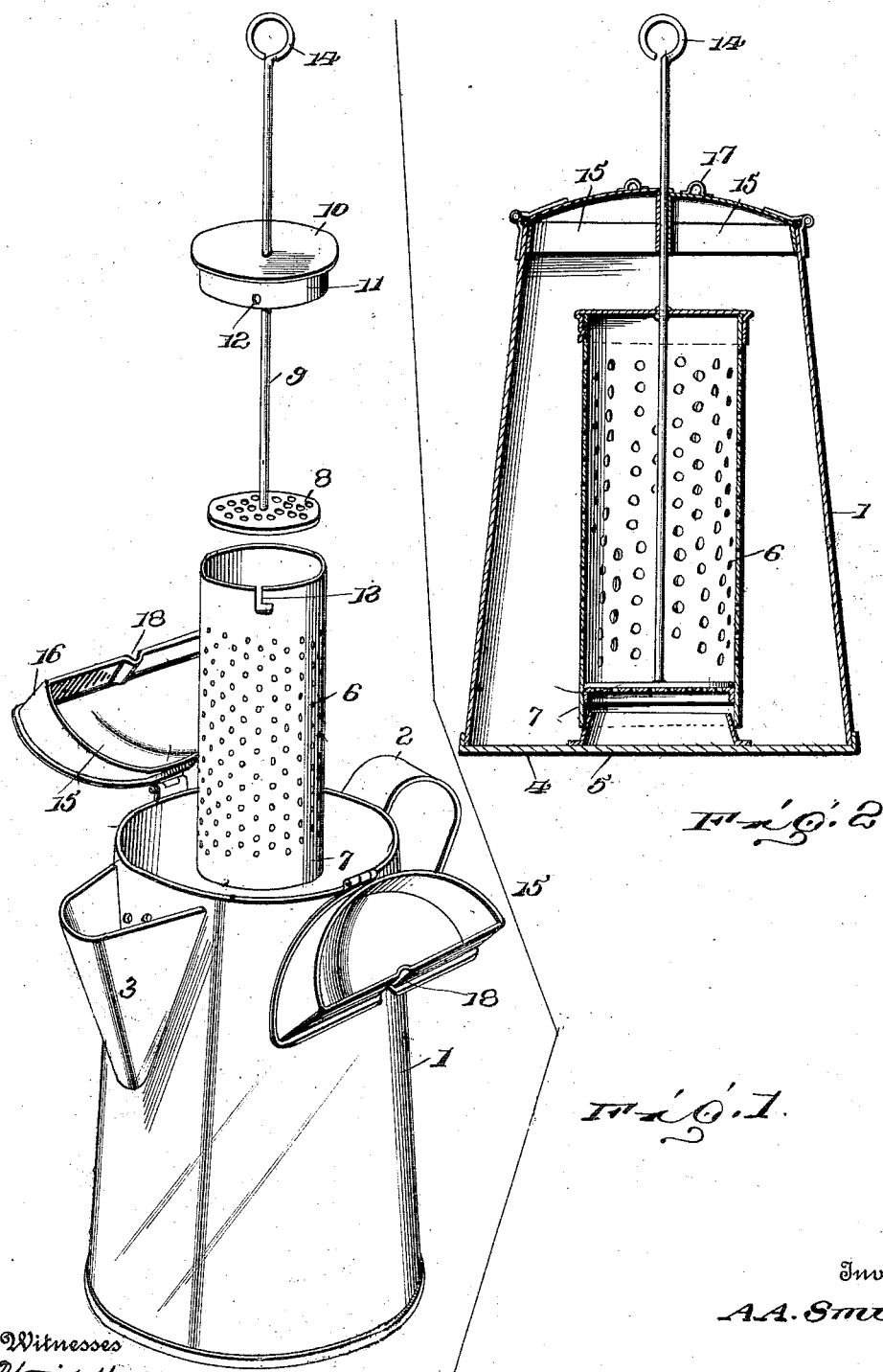

ARTHUR A. SMITH, OF CEDAR VALE, KANSAS.

COFFEE-POT.

1,018,684.

Specification of Letters Patent.

Patented Feb. 27, 1912.

Application filed June 3, 1911. Serial No. 631,150.

*To all whom it may concern:*

Be it known that I, ARTHUR A. SMITH, a citizen of the United States, residing at Cedar Vale, in the county of Chautauqua and State of Kansas, have invented certain new and useful Improvements in Coffee-Pots, of which the following is a specification.

This invention relates to coffee pots of that type including a container for the ground coffee, and the invention aims, among other things, to provide within the container a plunger which may be removed from the container and will carry with it the coffee grounds.

A further aim of the invention is to provide the plunger, mentioned above, with a handle which extends through the closure for the body of the coffee pot so that the handle end of the plunger will be comparatively cool at all times and the coffee grounds may be removed from the container before the same becomes cool after the coffee has been boiled. In this connection the invention aims also to provide the body of the coffee pot with a novel form of closure so constructed as to permit of the extension of the handle of the plunger to the exterior of the pot.

For a full understanding of the invention reference is to be had to the following description and accompanying drawing, in which:—

Figure 1 is a perspective group view illustrating the parts of the coffee pot in position to be assembled. Fig. 2 is a vertical transverse sectional view.

Corresponding and like parts are referred to in the following description and indicated in all the views of the accompanying drawing by the same reference characters.

In the drawing, the body of the coffee pot is indicated by the numeral 1 and is provided with a handle 2 and spout 3, both of the ordinary form. The bottom of the body 1 is indicated by the numeral 4 and is provided with an upstanding flange 5 of frusto-conical form. The container for the ground coffee is indicated by the numeral 6 and is preferably cylindrical and foraminous both in its side and bottom walls, and its lower end is provided with a depending flange 7 designed to fit over the flange 5 whereby the container will be supported removably within the body 1. A plunger comprising a head 8 and a rod 9 is fitted within the container 6, the head 8 being flat and perforated and of substantially the same diameter as the internal diameter of the container. A closure 10 is provided for the container 6 and has a flange 11 fitting over the upper end of the container and formed with a stud 12 seating in a bayonet-slot 13 in the wall of the container 6. This cover 10 is fixed upon the rod 9 of the plunger, and when the plunger is lowered into the container the rod may be turned to cause engagement of the stud 12 in the slot 13, thereby locking the closure upon the container. In a like manner, the plunger rod may be turned in a reverse direction to cause disengagement of the stud 12 from the said slot whereby the rod may be lifted to remove the closure from the container and remove the plunger head from the container together with the coffee grounds collected thereon. At its upper end, the plunger rod is provided with an eye 14 which may be grasped for the purpose of manipulating the said plunger.

The closure for the body 1 is in the form of two sections 15 which are hinged at diametrically opposite points to the body 1 at the upper end thereof, the sections being substantially semi-circular and having their chordal sides in registration when the body 1 is closed, one of the sections being provided, at its said side with a flange 16 designed to overlap the said side of the other section. A handle or finger-piece 17 is provided upon each of the sections of the closure whereby they may be readily swung to open or closed position. The closure sections are formed along their chordal and arcuate sides with a depending flange and the flanges at the chordal sides of the sections are formed with registering notches 18 receiving the plunger rod 9, it being understood that the handle end of this rod projects above the closure for the body and is consequently comparatively cool even when the coffee is being boiled in the pot.

Should it be desired after having boiled a quantity of the coffee, to replenish the container without waiting for the pot to cool, the closure sections for the body may be swung open and the comparatively cool handle and plunger may be grasped and the plunger manipulated to remove the cover for the container and the head of the plunger together with the coffee grounds collected thereon.

Having thus described the invention what is claimed as new is:—

In combination with a pot having closure sections hingedly connected at the opposite edge portions of its top, a foraminous container, means for supporting the container upon the bottom of the pot, a rod having at its lower end a foraminous head adapted to fit snugly within the container, a closure fixed to the rod and having stud and slot connection with the container, the head and the closure being spaced to that extent that when the head is against the bottom of the container the closure fits snugly against the upper edge thereof.

In testimony whereof, I affix my signature in presence of two witnesses.

ARTHUR A. SMITH. [L.S.]

Witnesses:
 LEWIS T. WOOLLEY,
 ELIJAH C. COLE.

Copies of this patent may be obtained for five cents each, by addressing the "Commissioner of Patents, Washington, D. C."